US009860704B2

(12) United States Patent
Kapicioglu et al.

(10) Patent No.: US 9,860,704 B2
(45) Date of Patent: Jan. 2, 2018

(54) VENUE IDENTIFICATION FROM WIRELESS SCAN DATA

(71) Applicant: Foursquare Labs, Inc., New York, NY (US)

(72) Inventors: Cagatay Berk Kapicioglu, New York, NY (US); Blake Shaw, New York, NY (US)

(73) Assignee: Foursquare Labs, Inc., New York, NY (US)

( * ) Notice: Subject to any disclaimer, the term of this patent is extended or adjusted under 35 U.S.C. 154(b) by 0 days.

(21) Appl. No.: 14/674,288

(22) Filed: Mar. 31, 2015

(65) Prior Publication Data

US 2016/0295372 A1    Oct. 6, 2016

(51) Int. Cl.
| | |
|---|---|
| *H04L 29/08* | (2006.01) |
| *H04W 4/02* | (2009.01) |
| *G06Q 30/02* | (2012.01) |
| *G06F 17/30* | (2006.01) |
| *H04W 64/00* | (2009.01) |
| *H04W 24/02* | (2009.01) |

(52) U.S. Cl.
CPC ........ *H04W 4/028* (2013.01); *G06F 17/3087* (2013.01); *G06F 17/30241* (2013.01); *H04W 4/021* (2013.01); *H04W 64/00* (2013.01); *H04W 24/02* (2013.01)

(58) Field of Classification Search
CPC ....... H04W 4/028; H04W 64/00; H04W 4/02; H04W 48/04; G06F 17/30241; G01S 5/02; G01S 5/0252; G01S 5/14; G01S 19/14; H04L 29/08657; H04L 29/08108; H04L 29/08936; H04M 1/72572; H04M 1/72577

USPC .......................................... 455/456.3, 414.3
See application file for complete search history.

(56) References Cited

U.S. PATENT DOCUMENTS

| | | | |
|---|---|---|---|
| 8,150,844 B2* | 4/2012 | Redstone ............ | G06F 17/3087 455/456.1 |
| 8,180,369 B1* | 5/2012 | Sheikh ............... | G06Q 30/0205 340/8.1 |
| 8,489,596 B1 | 7/2013 | Milton et al. | |
| 8,504,073 B2* | 8/2013 | Svendsen ............... | G06Q 30/02 455/414.2 |
| 8,599,758 B1 | 12/2013 | Ogale et al. | |

(Continued)

OTHER PUBLICATIONS

International Search Report and Written Opinion for International Application No. PCT/US2016/025268, dated Jun. 16, 2016, 15 pages.

*Primary Examiner* — Sharad Rampuria

(57) ABSTRACT

In non-limiting examples, wireless scan data collected from a processing device is directly mapped to venues. Wireless scan data is received from a processing device where the wireless scan data comprises at least a first identifier of a wireless connection. Venues associated with the first identifier are identified from a mapping of wireless identifiers to venues based on active validation data associated with particular venues including historical wireless scan data of the particular venues. The plurality of venues are ranked according to a likelihood that the processing device is located at a particular venue based on evaluating the active validation data including the historical wireless scan data from the mapping. A predicted venue that the processing device is located at is determined based on the ranking of the plurality of venues. Other examples are also described.

20 Claims, 5 Drawing Sheets

(56) References Cited

U.S. PATENT DOCUMENTS

| | | | |
|---|---|---|---|
| 8,775,420 B2 * | 7/2014 | Scheibe | H04W 4/02 455/456.6 |
| 8,959,098 B2 * | 2/2015 | Skibiski | G06Q 30/02 455/404.2 |
| 2007/0264969 A1 * | 11/2007 | Frank | G06Q 10/1095 455/404.2 |
| 2013/0325855 A1 * | 12/2013 | Kapicioglu | G06F 17/30241 707/724 |
| 2014/0031067 A1 * | 1/2014 | Kubo | H04W 4/02 455/456.3 |

* cited by examiner

200

VENUE IDENTIFICATION FROM WIRELESS SCAN DATA

BACKGROUND

Location-based services detect location using a variety of methods. Typically, location-based services are designed to estimate geographic coordinates of a processing device, such as latitude and longitude. However the specific venue the processing device is located at is usually a point of interest rather than geographic coordinates associated with the processing device. It is with respect to this general environment that aspects of the present technology disclosed herein have been contemplated.

SUMMARY

In a non-limiting example of the present disclosure, wireless scan data collected from a processing device is directly mapped to venues. Wireless scan data is received from a processing device where the wireless scan data comprises a first identifier of a wireless connection. Venues associated with the first identifier are identified from a mapping of wireless identifiers to venues based on active validation data associated with particular venues including historical wireless scan data of the particular venues. The plurality of venues are ranked according to a likelihood that the processing device is located at a particular venue based on evaluating the active validation data including the historical wireless scan data from the mapping. A predicted venue that the processing device is located at is determined based on the ranking of the plurality of venues.

In another non-limiting example, wireless scan data collected from a processing device is directly mapped to venues. Wireless scan data is received from a processing device where the wireless scan data comprises a plurality of media access control (MAC) addresses. Venues associated with the MAC addresses are identified from a mapping of MAC addresses to venues based on evaluation of active validation data associated with particular venues including historical wireless scan data of the particular venues. The plurality of venues are ranked according to a likelihood that the processing device is located at a particular venue based on evaluating the active validation data including the historical wireless scan data from the mapping. A predicted venue that the processing device is located at is determined based on the ranking of the identified venues.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures. As a note, the same number represents the same element or same type of element in all drawings.

DETAILED DESCRIPTION

Figure 1A:
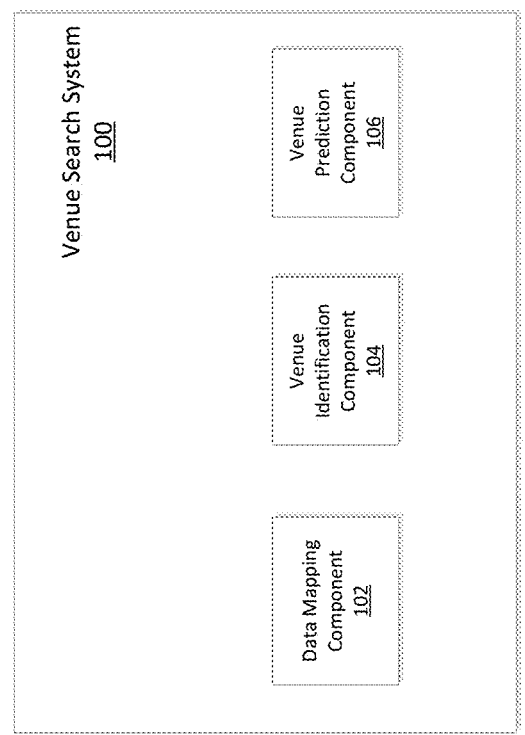
FIG. 1A illustrates an exemplary system 100 showing interaction of components for implementation of venue search applications and services as described herein.

Non-limiting examples of the present disclosure describe determining the venue that a device is located at by directly mapping wireless scan data to venues. A venue is a defined area for organization of people/events. A venue may comprise one or more venues, for example a building may have a plurality of units that can each be considered venues. Examples of venues include but are not limited to: places of business (e.g., stores, restaurants, and offices), homes, buildings/portions of buildings such as suites and apartments, museums, schools, theatres, event halls, airports, transportation/vehicles, and stadiums, among other examples. Wireless scan data is any signal information collected from a processing device that is usable to identify wireless connections (e.g., access points) for a processing device to connect with. Wireless scan data comprises at least one identifier of a wireless connection. Examples of identifiers of a wireless connection include, but are not limited to, media access control (MAC) addresses, timestamps, universally unique identifiers (UUIDs), service set identifiers (SSIDs), frequency information, signal strength information, accuracy information, device information, geographical information, WI-FI information, Bluetooth, infrared, and/or beacon information, among other examples. An application or service may be operable to predict a venue that a process device may be located at or otherwise provide data about or associated with a venue (e.g., a status update, a post on a social network, etc.). For example, a check-in is an indication that a device is presently at or has visited a venue. In one example, a check-in to a venue may occur passively where an application/service may passively detect and predict a venue that a processing device may be located at. Passive detection of a venue may occur without a user of a processing device actively performing operations to enable a check-in operation for a venue. As an example, an application/service may passively collect and evaluate information to predict a venue that a processing device may be located and provide notification to the processing device regarding a visit to a particular venue. For instance, a processing device may receive a notification asking a user of the processing device whether they would like to check-in to a venue. In another example, an application/service may send notification to a processing device that a particular venue has been visited when the application/service has a high level of confidence in a venue prediction. In another example, a check-in may occur by a user of a processing actively taking action to acknowledge visit to a particular venue. One skilled in the art will recognize that venue identification is not limited to check-in operations at a specific venue. For example, venue mapping to wireless scan data may be used to identify similar venues, make venue-specific recommendations, generate targeted advertisements related to venues, make queries, messaging, video or telephonic communication, transmit notification to processing devices and/or users associated with the processing devices, and trigger applications/services, among other examples. For ease of discussion, examples provided throughout the disclosure will be described with respect to check-in data, among other examples. However, one of skill in the art will appreciate that the examples provided herein can be practiced using other types of data as identified above. The present disclosure provides an alternative to manually attempting to associate wireless data with venues where a process of associating wireless scan data with specific venues is automated by using data generated from a geotagging in a social network.

As an example, consider an attempt to predict a venue that a processing device is located at or a check-in to a venue (e.g., restaurant) in New York City. In other examples, a user may seek to discover similar venues, venue-specific recommendations, or receive targeted advertisements related to venues, among other examples. A geographic location of a venue is able to be identified based on geographical information, such as latitude and longitude coordinates. However, that geographic location may include more than one venue. For example, a geographical location may identify a building in New York City. A restaurant that a device is attempting to check-in to may be located on the fifth floor of a building, where the building may include other venues on floors one through four, for example. Accordingly, it may be difficult to accurately predict an exact venue that the device is attempting to check-in to using geographical information. Further, collecting of geographical information (e.g., via GPS signals) uses more resources (e.g., processing/battery power) as compared with collecting other wireless scan data. The present disclosure builds mapping structures that map wireless scan data directly to a venue and is thus able to accurately and efficiently predict a venue that a processing device is located at without the need to specifically focus on collecting and analyzing geographical information. Also, by directly modeling venues rather than geographical coordinates, specific "noise" patterns of a venue are able to be learned. For example, signals might consistently bounce off structures in a specific way leading to inaccurate venue prediction (e.g., predicts a venue located across the street from where a mobile device is actually located at due to signal noise). The present disclosure is able to use the generated mapping structures (e.g., identifying historical noise patterns) to process and evaluate signal noise data (e.g., identify signal noise patterns). In doing so, a venue prediction system or service can increase accuracy in venue prediction determination.

A number of technical advantages are achieved based on the present disclosure including but not limited to: mapping of venues to wireless scan data, generation of robust venue mapping indexes, scalability of venue search models, improved accuracy in venue identification/prediction, enhanced reliability in venue check-ins including reduction in incorrect venue predictions, reduced processing load on processing devices during data collection and venue check-in, control over user interaction for venue searching (e.g., collection of wireless scan data) and venue identification, and improved usability related to venue check-in applications and services, among other examples.

FIG. 1A illustrates an exemplary system 100 showing interaction of components for implementation of venue search applications and services as described herein. Exemplary system 100 presented is a combination of interdependent components that interact to form an integrated whole for venue search/check-in applications and services. Components of the systems may be hardware components or software implemented on and/or executed by hardware components of the systems. In examples, system 100 may include any of hardware components (e.g., used to execute/run operating system (OS)), and software components (e.g., applications, application programming interfaces, modules, virtual machines, runtime libraries, etc.) running on hardware. In one example, an exemplary system 100 may provide an environment for software components to run, obey constraints set for operating, and makes use of resources or facilities of the system 100, where components may be software (e.g., application, program, module, etc.) running on one or more processing devices. For instance, venue search/identification operations (e.g., applications, instructions, modules, etc.) may be run on a processing device such as a computer, mobile device (e.g., smartphone/phone, tablet) and/or any other electronic devices. As an example of a processing device operating environment, refer to operating environment 400 of FIG. 4. In other examples, the components of systems disclosed herein may be spread across multiple devices. For instance, input may be entered on a client device (e.g., mobile phone) and information may be processed or accessed from other devices in a network such as one or more server devices used, for example, identification of potential candidate venues and prediction of a venue a processing device is visiting or is located at.

Figure 1B:
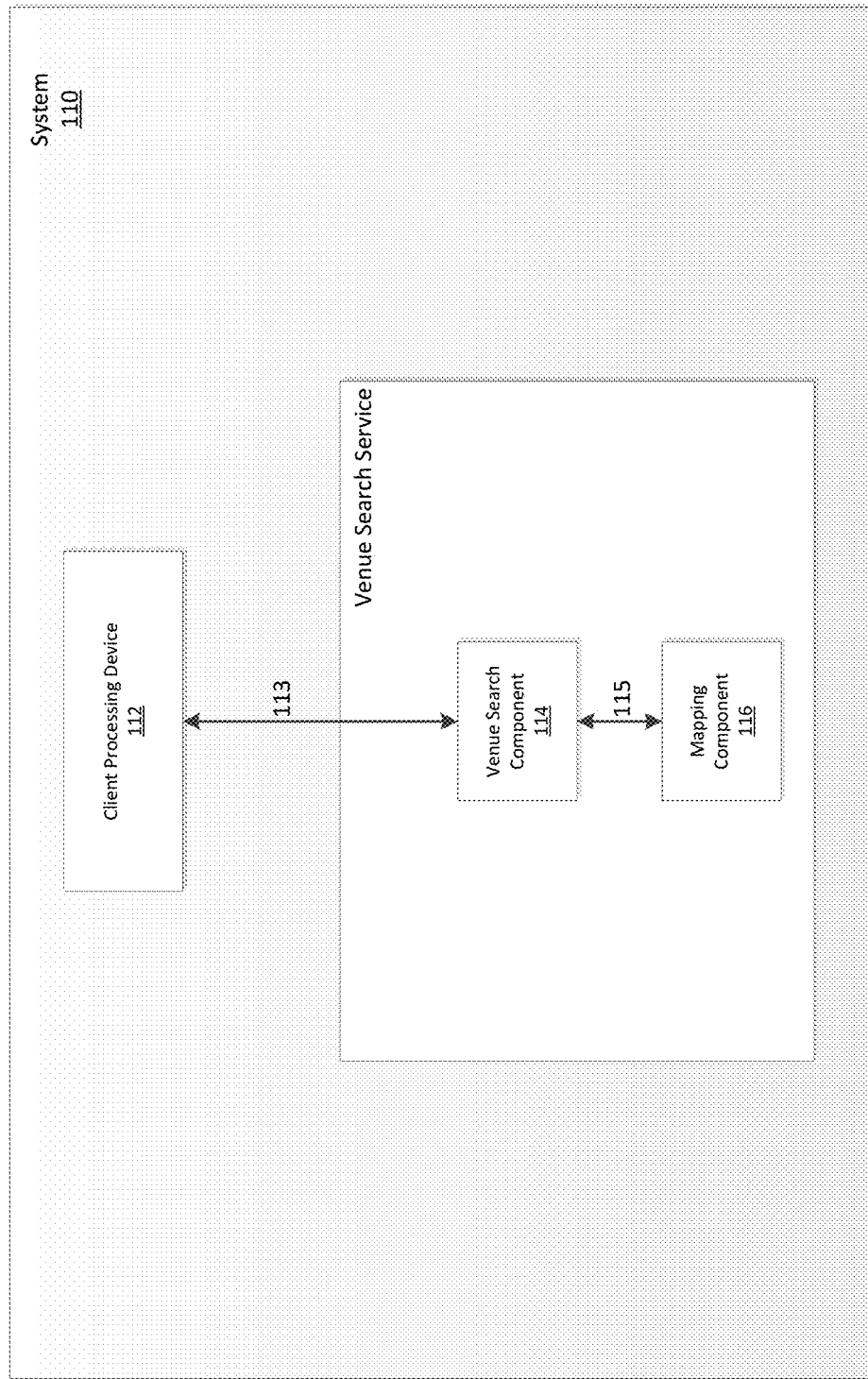
FIG. 1B illustrates an exemplary system 110 showing interaction of components for implementation of a distributed network implementing venue search applications/services as described herein.

As one example, the system 100 comprises a data mapping component 102, a venue identification component 104, and a venue prediction component 106, each having one or more additional components. One of skill in the art will appreciate that the scale of systems such as system 100 may vary and may include more or fewer components than those described in FIG. 1A. In some examples, interfacing between components of the system 100 may occur remotely, for example where components of system 100 may be spread across one or more devices of a distributed network as shown in FIG. 1B and described in the description of FIG. 1B.

The data mapping component 102 is a component of system 100 that may be used to generate and maintain one or more mapping structures mapping wireless scan data with active validation data and/or processing device related information. Active validation data is any data that is associated with a particular venue and actively collected by a venue identification/prediction system or service. Examples of active validation data include but are not limited to: venue check-in data obtained when a processing device associated with a user profile checks into a venue, notifications sent/received by an system or service including passive check-in at a venue by the system/service, user profile updates, postings associated with a user profile, social information such as friends/connections associated with a user profile, and spatial information associated with a processing device upon which a user profile is signed-in, among other examples. Processing device related information is any information collected by a processing device or about a processing device that can be used with venue search/prediction systems or services. Examples of processing device related information include but are not limited to: geocoding information, operating system information, application information, and device information (e.g., wireless device information), among other examples. Active validation data and/or processing device related information is usable to improve venue prediction accuracy and enhance venue predictions in determining where a processing device is located at.

The data mapping component 102 also stores venue information comprising any information related to a particular venue. Examples of venue information stored by the data mapping component 102 include but are not limited to: venue identifiers such as name and nicknames, wireless scan data associated with the venue, contact descriptions and informational data such as menus, hours of operation, contact information, statistical data, reviews, etc. In one example, venue information may be collected and stored in one or more memories/storages (e.g., databases) associated with the data mapping component 102. As an example, venue information may be maintained in a mapping structure of the data mapping component 102. A mapping structure is a collection of information/data arranged in an ordered way. Examples of mapping structures include but are not limited to: indexes, files, charts/graphs, diagrams, webpages, databases, and workflows, among other examples. As an example, a mapping structure maps wireless scan data with venues in accordance user data.

Mapping structures may be in maintained in any form and stored on a network storage (or storages) of the system 100 associated with the data mapping component 102. One skilled in the art will recognize that the data mapping component 102 is robust enough to store and manage very large amounts of data, for example data related to billions of venue check-ins or user profiles. In one example, information for mapping structures of the data mapping component 102 may be spread across multiple devices in a distributed network. As an example, a mapping structure may be an index that maps wireless devices to venues, which can be used, for example, to improve accuracy in predicting a venue that a user is located at. For instance, a mapping structure may map information collected from a wireless scan (e.g., wireless scan data) such as media access control (MAC) addresses to venues based on historical wireless scan data (e.g., Wi-Fi data) and active validation data (e.g., check-in patterns of a user). In other examples, one or more mapping structures may be generated identifying wireless signal strength (or predicted wireless signal strength) associated with particular venues. When a processing device checks in to a venue or alternatively a venue identification/prediction system/service identifies a venue for check-in/checks a processing device into a venue, wireless scan information is collected and aggregated into at least one mapping structure in association with active validation data associated with the occurrence. In examples, the wireless scan data collected may be associated with a venue identifier (e.g., venue id) that is used to identify a venue. In examples, a venue identifier may be mapped to more than one venue. For example, wireless scan data may identify a MAC address that is associated with multiple venues. Wireless identifier information collected from wireless scan data can use evaluated to make a determination as to which of the multiple venues a processing device is located at.

The data mapping component 102 may contain a plurality of mapping structures related to mapping of wireless scan data with venues, venue information and any other information usable to identify and predict venues that a processing device may be located at. The data mapping component 102 may be associated with a plurality of components such as devices, storages (e.g., memories) and databases, among other components. In one example, the data mapping component 102 is used to log all wireless scan data and associate wireless scan data with venue identifiers that are retrieved from active validation data (e.g., previous user check-in operations). Active validation data may be logged by the data mapping component 102 in any form that can be used to improve venue identification and venue prediction from collected data. In one example, data is logged and/or mapped in an offline computation. However, data mapping is not limited to this example and may be done online as well. In one example, an automated processing occurs where wireless scan data is collected and aggregated into a mapping structure (e.g., index or table). In an alternative example of system 100 another component may be introduced that is used to implement learning processing related to the collection and evaluation of data. In an example, learning algorithms such as Naïve Bayes and Cosine Similarity learning algorithms may be used to process and learn historical patterns in collected data such as active validation data.

As an example, one mapping structure generated by the data mapping component is an organization of information (e.g., file) keyed on a venue identifier that lists expected signal strengths for nearby wireless transmitters for venue (and can include a probabilistic model of how signal strength is expected to vary at each venue). Another exemplary mapping structure is an organization of information that indicates suggested venues that are associated with wireless identifiers (e.g., MAC addresses, UUIDs, SSIDs) in a given area. Another example is a mapping structure related to the collection of active validation data. Other example mapping structures comprise indexes that incorporate machine learning models. One skilled in the art will recognize that the data mapping component 102 may maintain any organization of data (or arrangement of data) stemming from collection of wireless scan data and active validation data.

The data mapping component 102 interfaces with other components of system 100 including the venue identification component 104 and the venue prediction component 106. For example, the venue identification component 104 may provide wireless scan data, from a processing device, that is able to be cross-referenced with mapping structures of the data mapping component 102 during modeling of data. In one example, this may be done in an online retrieval operation. However, one skilled in the art will recognize that the present disclosure is not limited to an online retrieval operation. The evaluation of wireless scan data using one or more mapping structures of the data mapping component 102 enables a corresponding venue search application/service to accurately identify venues and predict a particular venue that a processing device is currently or was previously located at. In examples, the data mapping component 102 intelligently updates mapping structures as more and more data is collected over time. Updates to data maintained by the data mapping component 102 may be programmed to occur at any point in time including when new data is received. The data mapping component 102 may also employ data modeling algorithms for update of data to include in mapping structures. In one example, dynamic programming processing is used to align wireless scan data with venue data. In another example, a filtering model may be applied to determine how to associate wireless scan data (e.g., MAC address) of active validation data with a venue. For instance, any type of filtering process may be applied to identify whether data of a venue check-in, for example, is to be added to a mapping structure (e.g., index) of the data mapping component 102. As an example, a process may be employed that associates a venue with wireless scan data (e.g., MAC address) when two or more check-ins have linked the wireless scan data with the venue. This may help minimize the number of false positives where a venue is incorrectly associated with wireless scan data. In another example, wireless scan data (e.g., MAC addresses) is filtered/removed from a mapping structure if a variance observed (based on geographic coordinates) is beyond a range, for example a kilometer. In other examples, processing executed identifies wireless access points and/or Bluetooth devices that are non-stationary. In one example, non-stationary access points/Bluetooth devices are discarded for purposes of geolocation.

Telemetry data may be maintained in association with mapping structures maintained by the data mapping component 102. Telemetry data is any data that can be monitored/reported in associated with processing related to venue search services. Telemetry data may be collected on wireless scans before a processing device checks-in to a venue (or before an application/service identifies a venue as being visited) as well as when the processing device checks-in to a venue or an application/service transmits a notification that a venue is visited. As examples, telemetry data may be reported based on the mapping structures generated and maintained by the data mapping component 102 and updates of data maintained by the data mapping component 102.

The venue identification component 104 is a component of system 100 that is used to retrieve wireless scan data from a processing device(s) and identify and retrieve venues that are associated with the collected wireless scan data. To enable venue search identification, the venue identification component 104 interfaces with the data mapping component 102. The venue identification component 104 also interfaces with the venue prediction component 106 to provide data collected and analyzed to the venue prediction component 106 enabling venue prediction to occur. In one example, the venue identification component 104 collects wireless scan data before a processing device checks-in to a venue. This is an example of passive data collection where wireless scan data is collected without a processing device making a request for scan data to be collected for venue identification. This improves an ability of system 100 to predict a venue that the processing device and user is located at, increase the efficiency in data collection, and maximize a user experience (e.g. of a venue search system/service). However, in other examples, wireless scan data is able to be collected at any time in an active or passive manner. In most cases, it may be difficult to collect sensor data before a check-in occurs since it might take a few seconds for a processing device to scan nearby access points once a user of a processing device indicates a desire to check-in to a venue. However, the present application presents examples that enable passive collection of wireless scan data by a processing device before making an on-line connection (e.g., live call) with a venue search/identification system/service to begin venue prediction determination. In an example, a processing device (e.g., through a local venue search system/service) collects passive data before updating a live call to a venue search system/service that may ultimately conduct a search of venues that the processing device may be located at. A venue search application/service includes instructions indicating that a wireless scan data is to be collected. An exemplary instruction is as follows:
signalScan={
wifi=true,
iBeacon=true
iBeaconUUIDs=
   ["E2C56DB5DFFB48D2B060D0F5A71096E0"]#optional, if iBeacon=true, to allow iOS to report data}.
One skilled in the art will recognize that any code may be used to control scanning for wireless scan data. As the venue identification component 104 is able to control when a scan for wireless scan data occurs, the venue identification component 104 can intelligently scan for wireless signals and minimize the amount of power needed for conducting scanning thus avoiding draining battery of the processing device.

In an example, the processing device (e.g., client), using a venue search application/service, will detect that system 100 requests the passive scan of wireless scan data. When a processing device detects that the system 100 would like the processing device to collect wireless scan data, the wireless scan data is collected and transmitted to the system 100 (e.g., the venue identification component 104). As an example, a collection of wireless scan data may look similar to the following, where commas separate fields collected and semicolons separate a wireless connection (e.g., access point) reading:
wifiScan=1365046921,FatDenz,aasdasdadsas,1800,-23;
   1365046921,Foursquare,gfddasdadsas,1800,-9
iBeaconScan=1365046921,
   E2C56DB5DFFB48D2B060D0F5A71096E0,00,70,near,
   0.1,-68;1365046921,
   E2C56DB5DFFB48D2B060D0F5A71096E0,00,140,far,
   0.1,-128.

As indicated above, wireless scan data is any signal information collected from a processing device that is usable to identify wireless connections. Fields of the wireless scan data that are collected include but are not limited to: timestamp information, SSID, UUID, MAC address, frequency (e.g., radio frequency in MHz), signal strength, access point identification, proximity, and accuracy, among other examples. However, one skilled in the art will recognize that fields associated with collection of wireless scan data may vary and be set by a programmer/application developer.

The venue identification component 104 also monitors scanning for wireless connections. In one example, the venue identification component 104 employs a stop detection operation/algorithm that detects whether the processing device remains in range of a wireless connection (e.g., identified by SSID, UUID, MAC address, etc.) for a predetermined amount of time. The venue identification component 104 continuously listens for wireless connections passively (in the background while the processing device is operating) in a low power way to preserve battery life of the processing device. In an example, the venue identification component 104 may have the processing device collect range information for a system-specified amount of time (e.g., 1 minute) and then notify the venue identification component 104 if the processing device is still within range of the wireless connection after ranging the wireless connection for the predetermined amount of time. An example instruction provided by the venue identification component 104 to processing device for ranging of a wireless connection is similar to the following:
signalMonitor={
iBeacon=true
iBeaconUUIDs=
   ["E2C56DB5DFFB48D2B060D0F5A71096E0"]
stopDuration=60#number of seconds the client should wait]
}.
If the processing device is still within range for the predetermined amount of time, the processing device collects and transmits the wireless scan data as identified above. In other instances, the processing device may notify the system 100 that the processing device is no longer in range of a wireless connection. System 100 logs the wireless scan data collected. In examples, the wireless scan data collected is augmented by additional information collected, for example from the processing device including but not limited to: processing device related information, active validation data, user identification, consumer information, timestamp information, and geographic information such as latitude and longitude, among other examples. Such information may be used to optimize a list of candidate venues that a processing device may be located at. When a venue search request is received, the venue identification component 104 retrieves a set of candidate venues that a processing device may be located at based on nearby wireless connections. In doing so, the venue identification component 104 performs operations to map wireless identifiers (e.g., MAC addresses, SSIDS, UUIDS, signal strength, etc.) to a list of venues (e.g., by venue identifiers) and also identifies other auxiliary statistics that may assist the venue identification component 104 in determining a venue that a processing device is located at. As an example, a MAC address of a wireless connection is mapped with one or more objects providing information on a wireless connection. For a given aspect of the wireless scan data (e.g., MAC address), the auxiliary statistics are calculated from the wireless connection scans that are associated with the wireless scan data and venue information. Examples of auxiliary statistics include but are not limited to: descriptive statistics, inferential statistics, means of coordinates associated with scanned data, percentiles corresponding with distances between associates coordinates, mean, median, average, and deviation, among other examples.

The venue identification component 104 compares a listing of candidate venues with venue information maintained by the data mapping component 102. As an example, the venue identification component 104 may execute an operation that outputs all wireless scan data associated with a particular venue that is maintained by the data mapping component 102. The venue identification component 104 may search for wireless scan data of a venue using any information available including but not limited to: information from the wireless scan data (e.g., MAC addresses, SSIDS, UUIDS) and venue identification, among other examples. In one example operation, a query such as the following query may be used to identify wireless scan data associated with a venue that is maintained by the data mapping component 102:

SELECT wifisignals, 'timestamp'
FROM thriftlogs.passive_sensor_scans
WHERE venueid='4ef0e7cf7beb5932d5bdeb4e'
ORDER BY 'timestamp' DESC
LIMIT 100.

However, one skilled in the art will recognize that a query is not limited to the above identified fields. For example, a search query of the data mapping component 102 may be keyed on a MAC address of the wireless scan data, among other examples.

The identified venues may then be ranked according to likelihood that the processing device is located at a particular venue. In doing so, the venue identification component 104 applies machine learning processing to evaluate the wireless scan data collected in comparison with data managed by the data mapping component 102, for example active validation data and processing device related information. A machine learning processing is any process that operates by building a classifier based on analyzing example input(s) and making predictions or decisions by analyzing input using the classifier. In examples, the machine learning processing is built and/or tailored to specifically model data obtained from wireless scans and data managed by the data mapping component 102 such as active validation data and/or processing device related information. Machine learning processes used may employ any type of statistical analysis including classification such as binary classification or multiclass classification and further include any methods suitable for learning classifiers such as Bayesian networks (e.g., Naïve Bayes), Cosine Similarity algorithms, support vector machine (SVM) processing, decision trees (e.g., random forest), support vector machines, neural networks, probit regression, and/or logistic regression, among other examples. In one example, machine-learning processing employs a naive Bayes classifier with binary features, to rank the identified venues.

As an example, application of a machine-learning process may be used to determine likelihood that the processing device is located at a particular venue by evaluating the wireless scan data and data (e.g. indexes) maintained by the data mapping component 102. Likelihood that the processing device is located at a particular venue is a probability determined from evaluation of wireless scan data associated with active validation data (e.g., historical venue check-ins) and/or processing device related information maintained by the data mapping component 102. For instance, a machine-learning process applied compares one or more wireless identifiers from wireless scan data with wireless identifiers that appear in active validation data associated with a venue (e.g., venue check-in). In one example, a MAC address identified for a wireless connection during a wireless scan may be compared with MAC addresses that appear in venue check-ins. In another example, signal strength detected for a wireless connection associated with the identifier is compared with predicted signal strength for a wireless connection of a venue. As an example, predicted signal strength for a wireless connection of a venue may be based on analysis of wireless scan data associated with active validation data associated with a particular venue (e.g., previous check-ins at a particular venue). In yet another modeling example, wireless scan data collected may be checked against popular venues in a nearby area based on an index mapped by the data mapping component 102. In further examples, machine learning processing may consider wireless scan data and processing device related information to improve accuracy in venue identification/prediction. In one example, geographic coordinates detected from a processing device may be analyzed (e.g., triangulation processing) and wireless scan data may be further evaluated to more accurately predict candidate venues.

Ranking of the identified candidate venues may comprise application of more than one machine-learning model to improve accuracy in determining likelihood that a processing device is located at a particular venue. Venue search applications may combine a variety of scoring methods (e.g., using linear and/or random forest learning methods) in order to rank candidate venues for place matching. Scores may be assigned to each of the candidate venues based on application of the one or more machine-learning processes. For instance, the applied machine learning processes may assign weights (e.g., probabilities) based on wireless identifier associated with evaluation of the wireless scan data. In examples, confidence scores are generated in accordance with each of a plurality of candidate venues based on application of the classifier using the machine learning processing. In one example, threshold values may be determined for ranking candidate venues. For instance, threshold values may be used to filter candidate venues that have a low likelihood (e.g., low confidence score) of being a venue that a processing device is located at. In one example, ranking of identified or retrieved candidate venues occurs in an online ranking processing. However, one skilled in the art will recognize that ranking of candidate venues is not limited to occurrence during online processing.

Applied machine-learning processes may be trained or retrained based on a number of factors. Factors that may also be considered in the ranking/scoring of candidate venues including but are not limited to: active validation data, spatial signals including location information of a wireless access point relative to the processing device, user data associated with a user profile of the processing device including social data, historical check-in data (e.g., venues where a user/processing device has previously checked-in too), filtering models, venue or wireless connection manufacturer information, and processing device information, among other examples. For instance, social signals (e.g. user data) associated with active validation data for a venue and/or other user data (e.g., associated with user profiles of an application/service) may be utilized by machine learning processing to train/re-train confidence levels in venue predictions. In an example of a filtering machine-learning model, filtering processes are applied to remove candidate venues that are less likely to be the venue a processing device is located at. Filtering processes can be employed to perform different types of filtering. Examples of filtering processes include but are not limited to processes aimed at: removing access points that are determined to be noisy (e.g., mobile routers), removing access points based on distance metrics (e.g., Euclidean distance) where an identifier of an access point may not be able to be trusted if the distance spanned is above a threshold value, and removing identifiers for business/socials reasons, among other examples. Business/social reasons include but are not limited to: company missions, business contracts, advertising, censorship, privacy, legal, and political, among other examples.

The venue prediction component 106 is a component of system 100 that may be used to predict a venue that the processing device is at based on the identified and ranked candidate venues. In one example, when a live call is made for a venue search by a processing device, the venue prediction component 106 sends a signal to the processing device to display one or more venues for the processing device to take action and execute venue check-in. Alternatively, a venue search/identification system/service may provide notification to a processing device of a venue prediction or automatically identify that a processing device has visited a venue based on a confidence score (e.g., determined by a probabilistic classifier) associated with a venue prediction. To enable venue predictions, the venue prediction component 106 interfaces with the data mapping component 102 and the venue identification component 104. As an example, the venue prediction component 106 evaluates the ranking of the candidate venues and predicts a venue that a processing device is located at based on the evaluation of wireless scan data (e.g., passively collected data) and/or evaluation of active validation data associated with a venue. In predicting a venue that a processing device is located at, the venue prediction component 106 may employ processes or models to select venues for output to a processing device according to ranking(s) (e.g. confidence scores) determined by the venue identification component 104. One or more venue predictions may be sent to a processing device. In alternative examples, a system or service may identify a venue as being visited by the processing device based on evaluation of a confidence score associated with a venue. For instance, a notification may be sent that a venue has been visited when system 100 determines that there is a very high likelihood (e.g., based on evaluation of confidence score) that a processing device is located at a particular venue. In one instance, a confidence score associated with a venue prediction may be compared with a predetermined threshold value to determine whether to send a notification associated with a particular venue to a processing device. In some examples, the notification may be an automatic check-in to a particular venue.

The venue prediction component 106 may also collect telemetry data when a processing device checks-in to a venue or an application/service determines a venue prediction. Telemetry data may be collected by the venue prediction component 106 to determine the accuracy of the venue prediction as well as update data structures maintained by the data mapping component 102. Thus, the data structures maintained by the data mapping component 102 can continue to become accurate and robust over time leading to improved accuracy in venue search and prediction.

In alternative examples of system 100, operations performed by the venue identification component 104 and the venue prediction component 106 are performed by a single component.

FIG. 1B illustrates an exemplary system 110 showing interaction of components for implementation of a distributed network implementing venue search applications/services as described herein. System 110 illustrates a distributed network fostering interaction of a client processing device 112 with system components for a venue search service to enable venue prediction determination. Examples of distributed networks that may be included in system 110 include but are not limited to cloud-computer environments, grid computer networks, and/or peer-to-peer networks, among other examples.

In system 110, client processing device 112 may be a processing device as described in system 100. As an example of a processing device and operating environment, refer to operating environment 400 of FIG. 4. In one example, the client processing device 112 is a computing device such as a desktop computer, laptop, mobile phone/smartphone, tablet, portable media player, personal data assistant (PDA), vehicle or any other processing device that enables venue identification and prediction. Client processing device 112 enables operation of a venue search service. As described in detail in the description of FIG. 1A, client processing device 112 interfaces with the venue search service to send and/or receive signals including signals for collection of wireless scan data, requesting of a venue search, receiving of predicted venues, actions (e.g., check-in, notifications, etc.) associated with a particular venue, and/or transmission telemetry data, among other examples. Communication line 113 represents such interactions between the client processing device 112 and a venue search component 114 of the venue search service. Communications between client processing device and the venue search service may be transmitted via a network, such as the Internet.

The venue search component 114 performs back-end operations to provide the client processing device 112 with one or more candidate venues that the client processing device 112 may be located at. Venue search component 114 is one or more components that perform operations similar to venue identification component 104 and venue prediction component 106 of system 100, as described with respect to FIG. 1A. The venue search component 114 may interface with a mapping component 116 to enable venue identification, ranking and prediction. The mapping component 116 is one or more components that perform operations similar to data mapping component 102 of system 100, as described with respect to FIG. 1A. Communication line 115 represents interactions between the venue search component 114 and the mapping component 116 to enable a venue search service for candidate venue identification and venue prediction. In one example, once the venue search service predicts venues for a user of the client processing device 112 to check-in to, the predicted venues are transmitted to client processing device 112 as represented by communication line 113. The transmission of telemetry data related to active validation data associated with a venue may be transmitted from processing device 112 via communication line 113.

Figure 2:
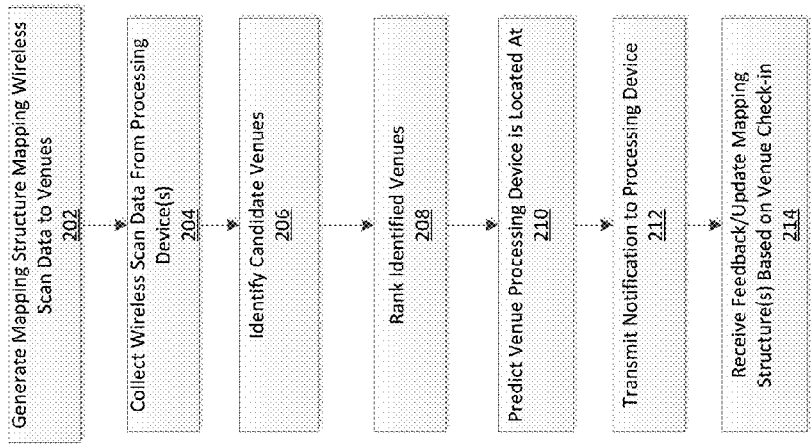
FIG. 2 illustrates an exemplary method 200 for implementation of venue search services as described herein.

FIG. 2 illustrates an exemplary method 200 for implementation of venue search services as described herein. As an example, method 200 may be executed by an exemplary system such as system 100 of FIG. 1A and system 110 of FIG. 1B. In examples, method 200 may be executed on a device comprising at least one processor configured to store and execute operations, programs or instructions. However, method 200 is not limited to such examples. In other examples, method 200 may be performed an application or service executing a venue search/prediction application or service. However, one skilled in the art will recognize that the operations described in method 200 can be implemented for other purposes including but not limited to identifying similar venues, making venue-specific recommendations, providing notifications and generating targeted advertisements related to venues, among other examples.

Method 200 begins at operation 202 where at least one mapping structure is generated that maps wireless identifiers to venues. Exemplary mapping structures generated associate wireless scan data with active validation data corresponding with particular venues. In one example, venue information may be stored on a network as one or more mapping structures stored on a storage (e.g., device having memory, database, etc.) and referenced to associate wireless scan data with venue information. In one example, generation of mapping structures occurs from a plurality of wireless scan data associated with active validation data for a venue (e.g., venue check-ins, user data and/or account data such as social network contacts, preferences, historical data, etc.). In examples, the plurality of wireless scan data is collected from processing devices and the active validation data is collected during check-in operations at a plurality of different venues. In another example, a collection of information is so robust that one or more mapping structures are generated from historical wireless scan data collected from active validation data (e.g., venue check-ins). Examples of wireless identifiers are provided in the above portions of the detailed description. In at least one example, a wireless identifier is a MAC address associated with a wireless connection. For example, a mapping structure generated may map MAC addresses to venues based on evaluating active validation data associated with particular venues. Information from the mapping structure is accessible to improve venue identification and venue prediction of a venue search application/service.

Flow proceeds to operation 204 where wireless scan data from a processing device is collected. Wireless scan data comprises an identifier of a wireless connection, for example, a wireless connection (e.g., an access point) that is associated with a venue. As identified above, a wireless identifier may be a MAC address associated with a wireless connection of a venue. Other examples of wireless scan data and identifiers of wireless scan data are described in further detail in the above portions of the detailed description including the description of FIG. 1A. Collections of wireless scan data occurs by a processing device such as client processing device 112 represented in FIG. 1B. In one example, collection of wireless data may occur passively before a venue search request is initiated by the processing device using a venue search application or may occur in response to a venue search request.

Flow proceeds to operation 206 where venues associated with the identifier of the collected wireless scan data are identified. Candidate venues may be identified when a user of a venue search application requests a venue search to retrieve venues or alternatively candidate venues may be identified automatically by a venue search application/service during evaluation of wireless scan data collected. Method 200 utilizes the one or more mapped data structures to identify candidate venues that may be associated with the wireless scan data collected. In one example, venues are identified by aligning (e.g., by wireless identifier) the wireless scan data with active validation data (e.g., wireless scan data associated with check-in operations at venues) using one or more mapped structures (e.g., as generated in operation 202). In one example, a MAC address identified from the collected wireless scan data is aligned with MAC address information from active validation data corresponding with a venue identified using the mapped structures.

Flow proceeds to operation 208 where the identified candidate venues are ranked according to likelihood that the processing device is located at a particular venue. The ranking performed in operation 208 may be based on comparison of wireless scan data and the active validation data from a plurality of venues. In one example, machine-learning processing is applied to rank retrieved venues based on patterns identified in wireless scan data. Operation 208 ranks the identified candidate venues by applying at least one machine-learning process to determine the likelihood the processing device is located at a venue. As an example, a machine-learning process assigns, for each venue, a probability that the venue is associated with the identifier based on evaluation of an identifier (e.g., wireless identifier) associated with the active validation data associated with particular venues. In one example, a machine learning process applied compares similarities between signal strength detected for a wireless connection associated with the identifier and predicted signal strength for a wireless connection of a venue. In another example, at least two machine-learning processes are applied to rank the identified candidate venues. For instance, a machine-learning process applied is a filtering process that removes one or more venues from a listing of identified venues based on application of one or more processes. Machine-learning processes may be retrained based on additional information such as one or forms of spatial information (e.g., collected during a scan of a processing device) and active validation data. As an example, active validation may comprise user data associated with a user profile of a venue search application/service operating on a processing device, where more than one user can be associated with the account. As an example, user data may further comprise social signals associated with a user profile operating on the processing device such as information broadcast over a network and friends/contacts associated with a user, among other examples. For instance, information identifying that friends of a user profile are all checked into one particular venue may be useful in identifying that a user desires to check into that same particular venue. In another example, a venue check-in history associated with a user profile may be useful in identifying a venue that a user is attempting to check-in to as users may frequent the same or similar venues over time. Operation 208 may incorporate such information to retrain a machine-learning process and improve an exemplary venue search application's ability to predict a venue for a check-in operation, as an example. In alternative examples, a venue search application may utilize active validation data such user data to predict a venue for notification (e.g., indication that a processing device has visited a venue). In one example, a confidence score may be determined according to how likely a processing device is located at a particular venue. Active validation data such as user data may be used to re-evaluate a confidence score for a particular venue.

Once venues have been identified and ranked, flow proceeds to operation 210 where a venue that the processing device is located at is predicted based on the ranking of the identified venues. This may enable a user to check-in to one of the listed venues or allows the venue search service to use the venue data to recommend similar venues or identify venues for targeted advertisements, and provide venue notifications to a processing device, for example. In one example, a number of highest ranking venues may be presented to a user of the venue search services. Output of ranked venues may be based on confidence level associated with venue prediction that is learned from application of machine learning processing. Once a determination has been made regarding venue prediction, flow proceeds to operation 212 where a notification of a venue prediction is transmitted to a processing device. Operation 212 may further comprise transmitting, to a processing device, a listing comprising one or more venues based on the ranking of the identified venues. In examples, a notification transmitted in operation 212 may comprise a request for a processing device to acknowledge that a venue is visited or alternatively, an automatic check-in/visit acknowledgement for a particular venue. When a user selects a venue from the predicted listing (or alternatively does not select a venue from the predicted listing) or acknowledges correctness of a notification associated with a venue, telemetry data regarding correctness of the predicted venue may be transmitted (operation 214) from a processing device to the venue search application/service. In examples, telemetry data may be collected in relation to a notification sent by a venue search application, for example where data may be collected regarding whether a notification such as a prediction as to a visited venue was correct or not based on active or passive acknowledgement from a processing device (e.g. user of a processing device). In examples, active acknowledgement may relate to taking action (e.g., clicking a button, swiping, posting information, sending social signals, etc.) to identify correctness of a venue prediction whereas passive acknowledgement may relate to any other type of acknowledgement such as not taking action to identify that a venue prediction is incorrect. In operation 214, feedback from action associated with a user profile (operating on a processing device) is received. As an example, the predicted venue may be verified if a check-in is made to the venue. In other examples, a user profile may be evaluated to determine whether a user acknowledges a venue prediction as being correct and/or other social signals such as whether a user recommended a venue. Otherwise, negative feedback may take the form of a check-in to a different venue or acknowledgement that a venue prediction is incorrect. Such information can also be used in the update/re-train machine learning processes/models. Based on feedback received (operation 214), one or more of the mapped structures may be updated. In other examples, updating of the mapped structures comprises creating new mapping structures based on received feedback/telemetry data to improve robustness of data available to a venue search system/service for making venue predictions.

Figure 3:
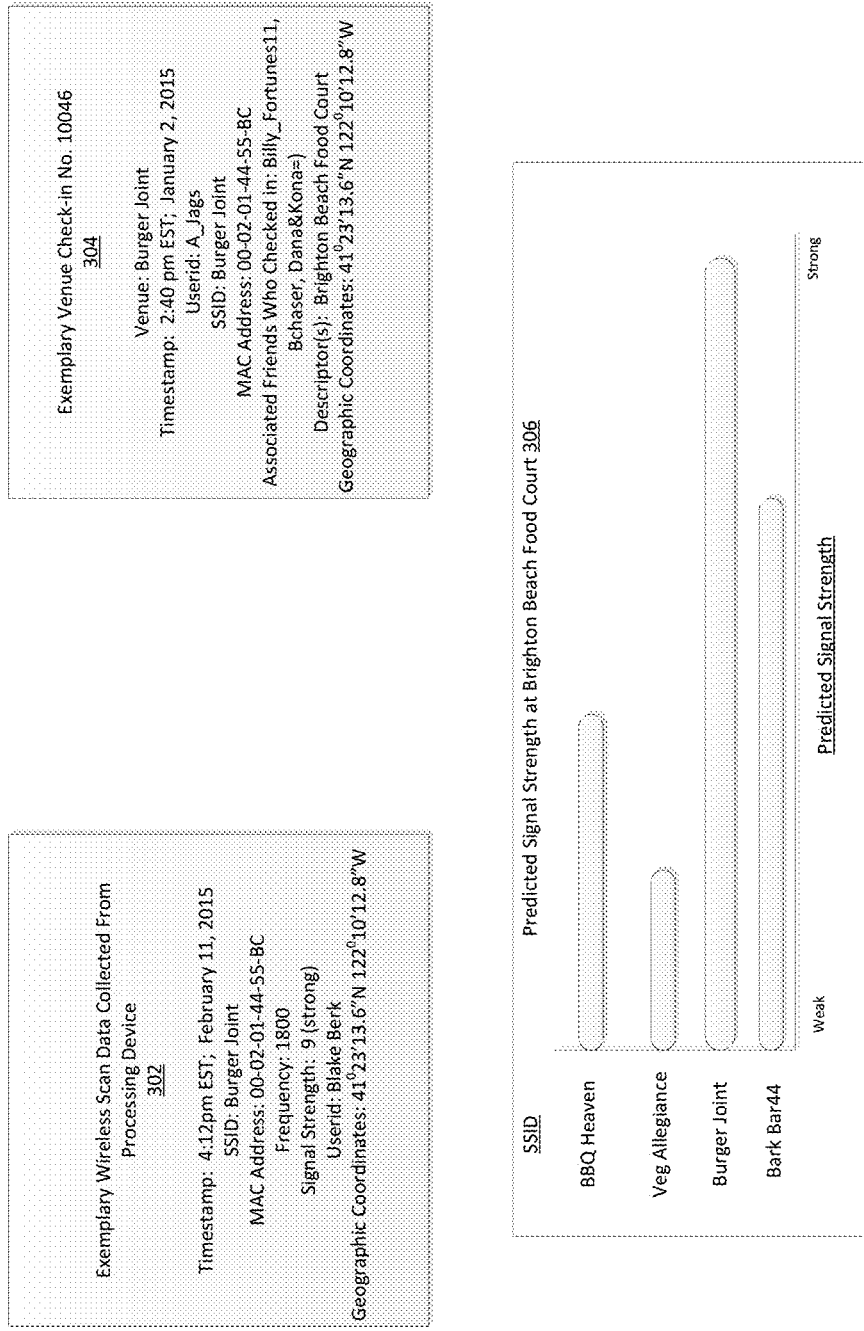
FIG. 3 illustrates examples of wireless scan data and venue check-in data as described herein.

FIG. 3 illustrates examples of wireless scan data and active validation data as described herein. FIG. 3 provides example data that can be used to improve venue prediction for a venue search system and/or service. In FIG. 3, block 302 (exemplary wireless scan data collected from processing device) represents example data that may be collected from a processing device. Blocks 304 (exemplary venue check-in No. 10046) and block 306 (predicted signal strength at Brighton Beach food court) represent example active validation data that may be maintained by a venue search system/service for venue identification and prediction. One skilled in the art will recognize that data included in blocks 302-306 are examples of data that may be associated with the present disclosure, and data included in blocks 302-306 may vary in form and/or presentation in accordance with the description of the present disclosure.

Block 302 illustrates exemplary wireless scan data collected from processing device. Examples of wireless scan data and identifiers of wireless scan data are described in detail in the above portions of the detailed description including the description of FIG. 1A. Collections of wireless scan data occurs by a processing device such as client processing device 112 represented in FIG. 1B. In one example, collection of wireless data may occur passively before a venue search request is initiated by the processing device using a venue search application. Wireless scan data comprises one or more wireless identifiers, examples of which include but are not limited to: MAC address, SSID, signal strength, beacon data, Bluetooth data, etc., as shown in block 302. Such wireless identifiers can be used to cross-reference with data managed by a venue search system/service for venue identification and prediction.

For example, a wireless identifier such as MAC address may be used to identify data such as a mapped structure (e.g., index) managed by a venue search system/service. Block 304 indicates a portion of data that may be included in a mapped structure (e.g., maintained in at least one storage) of a venue search system/service. As an example, a wireless identifier such as a MAC address, "00-02-01-44-55-BC" (as shown in block 302), can be used to identify any active validation data that relates to a particular venue associated with a same MAC address. For instance, a search conducted of data managed by a venue search system/service may yield data similar to venue check-in No. 10046 shown in block 304. As can be seen in block 304, a venue of "Burger Joint" was associated with MAC address "00-02-01-44-55-BC," the same MAC address identified in a portion of wireless scan data collected from a processing device (shown in block 302). Accordingly, evaluating additional wireless identifiers associated with wireless scan data can improve a probability that a venue search system/service is accurately predicting a venue. Ranking (e.g., assigned probability) can directly correspond with wireless identifiers evaluated. In some examples, ranking algorithms applied give higher weight to one wireless identifier over another wireless identifier as some wireless identifiers may provide better indication that a venue is associated with wireless scan data collected from a processing device.

In another example, more than one wireless identifier is used to identify and predict a venue based on wireless scan data collected. For instance, wireless identifiers of SSID and signal strength, among other exemplary wireless identifiers, can be used to associate wireless scan data with a venue. As shown in block 302, an SSID of "Burger Joint" and a signal strength indicating a strong signal is detected. As an example, active validation data managed by a venue search system/service may include data similar to that shown in block 306, where predicted signal strength for SSIDs in a geographic location (e.g., Brighton Beach) can be compared with the wireless scan data collected in block 302. Data from the wireless scan data such as geographic coordinates may be used to identify active validation data from mapped structures of a venue search system/service that has been generated to improve venue identification and prediction from wireless scan data. When comparing wireless scan data collected (block 302) with predicted signal strength data (block 306) maintained by a venue search system/service, it can be seen that an SSID of "Burger Joint" and a signal strength of "strong" are indicators that there is a very good likelihood that a venue named "Burger Joint" is a strong venue prediction candidate. Accordingly, evaluating additional wireless identifiers associated with wireless scan data can improve a probability that a venue search system/service is accurately predicting a venue. In an example, ranking algorithms applied to rank a likelihood that a processing device is located at a particular venue may base its ranking of venues (e.g., probability) based on a combination of wireless identifiers. In some examples, ranking algorithms may intelligently group wireless identifiers when evaluating wireless scan data in comparison with data managed by a venue search system/service. In examples, additional analysis may be used to identify which wireless access points and Bluetooth devices are non-stationary and therefore should be discarded for the purposes of geolocation.

Figure 4:
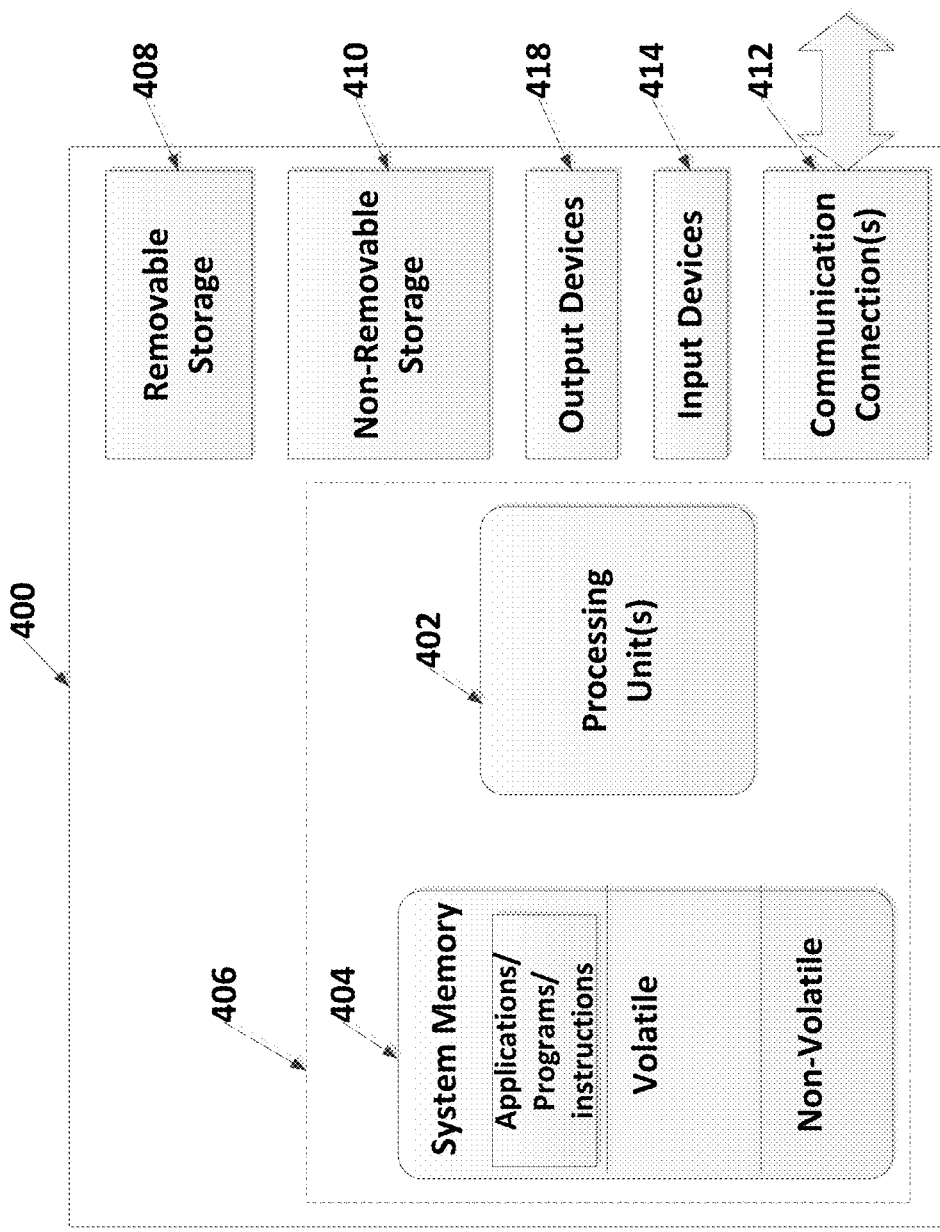
FIG. 4 illustrates one example of a suitable operating environment 400 in which one or more of the present examples may be implemented.

FIG. 4 and the additional discussion in the present specification are intended to provide a brief general description of a suitable computing environment in which the present invention and/or portions thereof may be implemented. Although not required, the embodiments described herein may be implemented as computer-executable instructions, such as by program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 4 illustrates one example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically includes at least one processing unit 402 and memory 404. Depending on the exact configuration and type of computing device, memory 404 (storing, among other things, venue-based applications module(s), e.g., venue check-in applications, venue search applications, geocoding/reverse geocoding applications, APIs, programs etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 typically includes at least some form of computer readable media. Computer readable media can be any available media that can be accessed by processing unit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

As stated above, a number of program modules and data files may be stored in the system memory 404. While executing on the processing unit 402, program modules 408 (e.g., applications, Input/Output (I/O) management, and other utilities) may perform processes including, but not limited to, one or more of the stages of the operational methods described herein such as method 200 illustrated in FIG. 2, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 400 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

This disclosure described some aspects of the present technology with reference to the accompanying drawings, in which only some of the possible embodiments were shown. Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A computer-implemented method comprising:
   receiving wireless scan data from a processing device, the wireless scan data comprising a first identifier of a wireless connection;
   identifying a plurality of venues associated with the first identifier of the collected wireless scan data from a mapping index of wireless identifiers to venues,
   wherein the mapping index is generated from wireless scan data collected from a set of devices and active validation data collected during visits to one or more venues,
   wherein the mapping index associates the wireless scan data with the one or more venues;
   ranking the plurality of venues according to a likelihood that the processing device is located at a particular venue based on evaluating
   at least one of spatial signals collected from the processing device and social signals associated with the processing device the active validation data including the historical wireless scan data from the mapping index; and
   determining a predicted venue that the processing device is located at based on the ranking of the plurality of venues; and
   transmitting a notification of the predicted venue to the processing device.

2. The computer-implemented method according to claim 1, wherein wireless scan data comprises a plurality of wireless identifiers, and the wireless identifier is at least one of a MAC address, beacon data and Bluetooth data.

3. The computer-implemented method according to claim 1, wherein the ranking further comprises applying a first machine-learning model to determine the likelihood the processing device is located at the predicted venue, wherein the first machine-learning model assigns a probability to at least a first venue of the plurality of venues that the first venue is associated with the first identifier based on evaluation of a second identifier associated with the active validation data accumulated from previous visits at the first venue.

4. The computer-implemented method according to claim 1, further comprising transmitting a notification including the predicted venue to the processing device, wherein the notification indicates that the processing device is located at the predicted venue.

5. The computer-implemented method according to claim 3, wherein the ranking further comprises applying at least a second machine-learning process to determine the likelihood the processing device is located at the venue, the second machine-learning process is a filtering process that removes one or more venues from the plurality of venues based on application of one or more filter processes.

6. The computer-implemented method according to claim 1, wherein the ranking further comprises applying a machine-learning model to determine the likelihood the processing device is located at the predicted venue, the machine learning model comparing similarities between signal strength detected for a wireless connection associated with the first identifier and a predicted signal strength.

7. The computer-implemented method according to claim 1, wherein determining the predicted venue further comprises transmitting, to the processing device, a listing comprising one or more venues based on the ranking of the plurality of venues.

8. The computer-implemented method according to claim 1, wherein determining the predicted venue further comprises receiving telemetry data regarding correctness of the predicted venue, and updating the mapping index based on the received telemetry data.

9. The computer-implemented method according to claim 1, wherein the active validation data further comprises the social signals from a user profile associated with the processing device.

10. The computer-implemented method according to claim 1, wherein the mapping index comprises at least one of wireless scan data, venue identifiers, contact information, venue information, and venue reviews.

11. The computer-implemented method according to claim 1, wherein generating the mapping index comprises using the wireless scan data to calculate auxiliary statistics, wherein the auxiliary statistics comprise at least one of: descriptive statistics associated with the plurality of venues; inferential statistics associated with the plurality of venues, coordinates associated with the wireless scan data; and percentiles corresponding to distances associated with the coordinates.

12. A system comprising:
a memory; and
at least one processor connected with the memory, configured to execute operations comprising:
receiving wireless scan data from a processing device, the wireless scan data comprising a plurality of MAC addresses;
identifying venues associated with the MAC addresses of the collected wireless scan data from a mapping index of MAC addresses to venues,
wherein the mapping index is generated from wireless scan data collected from a set of devices and active validation data collected during visits to one or more venues,
wherein the mapping index associates the wireless scan data with the one or more venues;
ranking the plurality of venues according to a likelihood that the processing device is located at a particular venue based on evaluating
at least one of spatial signals collected from the processing device and social signals associated with the processing device the active validation data including the historical wireless scan data from the mapping index; and
determining a predicted venue that the processing device is located at based on the ranking of the plurality of venues; and
transmitting a notification of the predicted venue to the processing device.

13. The system according to claim 12, wherein the ranking executed by the processor further comprises applying a first machine-learning model to determine the likelihood the processing device is located at the predicted venue, wherein the first machine-learning model assigns a probability to at least a first venue of the plurality of venues that the first venue is associated with a MAC address based on evaluation of a second MAC address associated with the active validation data accumulated for previous visits at the first venue.

14. The system according to claim 12, wherein the operations executed by the processor further comprising transmitting a notification including the predicted venue to the processing device, wherein the notification indicates that the processing device is located at the predicted venue.

15. The system according to claim 13, wherein the ranking executed by the processor further comprises applying at least a second machine-learning model to determine the likelihood the processing device is located at the predicted venue, and wherein the second machine-learning model is a filtering process that removes one or more venues from the plurality of venues based on application of one or more filtering processes.

16. The system according to claim 12, wherein the ranking executed by the processor further comprises applying a machine-learning model to determine the likelihood the processing device is located at the predicted venue, the machine learning model comparing similarities between signal strength detected for a wireless connection associated with a MAC address and a predicted signal strength for a wireless connection of a venue.

17. The system according to claim 12, wherein the determining of the predicted venue executed by the processor further comprises transmitting, to the processing device, a listing comprising one or more venues based on the ranking of the plurality of venues.

18. The system according to claim 12, wherein the determining of the predicted venue executed by the processor further comprises receiving telemetry data regarding correctness of the predicted venue, and updating the mapping index based on the received telemetry data.

19. The system according to claim 12, wherein the active validation data further comprises social signals associated with a user profile operating on the processing device, and the ranking of the identified venues evaluates at least one of spatial signals collected from the processing device and the social signals associated with the user profile to determine a probability that a venue is associated with a MAC address of the wireless scan data.

20. A computer-method comprising:
receiving wireless scan data from a first processing device;
identifying a plurality of venues associated with the wireless scan data using at least one stored mapping index to identify candidate venues,
wherein the mapping index is generated from wireless scan data collected from a set of devices and active validation data collected during visits to one or more venues,
wherein the mapping index associates the wireless scan data with the one or more venues;
ranking the plurality of venues according to a likelihood that the processing device is located at a particular venue using
at least one of spatial signals collected from the processing device and social signals associated with the processing device the active validation data including the historical wireless scan data from the mapping index; and
associating the wireless scan data with one or more candidate venues; and
transmitting a notification of the predicted venue to the processing device.

* * * * *